(12) United States Patent
Dickenson (10) Patent No.: US 7,546,588 B2
(45) Date of Patent: Jun. 9, 2009

(54) SELF-OPTIMIZABLE CODE WITH CODE PATH SELECTION AND EFFICIENT MEMORY ALLOCATION

(75) Inventor: Marc Alan Dickenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 10/937,702

(22) Filed: Sep. 9, 2004

(65) Prior Publication Data

US 2006/0053421 A1 Mar. 9, 2006

(51) Int. Cl.
G06F 9/44 (2006.01)
G06F 9/45 (2006.01)
G06F 13/00 (2006.01)

(52) U.S. Cl. .................. 717/131; 717/151; 711/170; 711/173

(58) Field of Classification Search ......... 717/151–153, 717/131
See application file for complete search history.

(56) References Cited

U.S. PATENT DOCUMENTS

| | | | | |
|---|---|---|---|---|
| 5,561,786 A | * | 10/1996 | Morse | 711/170 |
| 5,790,778 A | * | 8/1998 | Bush et al. | 717/132 |
| 5,828,883 A | * | 10/1998 | Hall | 717/133 |
| 6,070,009 A | * | 5/2000 | Dean et al. | 717/130 |
| 6,078,744 A | * | 6/2000 | Wolczko et al. | 717/153 |
| 6,189,141 B1 | * | 2/2001 | Benitez et al. | 717/153 |
| 7,089,537 B2 | * | 8/2006 | Das et al. | 717/132 |
| 7,296,261 B2 | * | 11/2007 | Witchel et al. | 717/136 |
| 2002/0073403 A1 | * | 6/2002 | Fleehart et al. | 717/131 |
| 2004/0103195 A1 | | 5/2004 | Chalasani et al. | |
| 2005/0044538 A1 | * | 2/2005 | Mantripragada | 717/151 |
| 2005/0108581 A1 | | 5/2005 | Hayo et al. | |
| 2005/0114849 A1 | * | 5/2005 | Megiddo | 717/151 |
| 2005/0166207 A1 | * | 7/2005 | Baba et al. | 718/105 |
| 2005/0223361 A1 | * | 10/2005 | Belbute | 717/124 |
| 2006/0048114 A1 | * | 3/2006 | Schmidt | 717/148 |
| 2006/0095427 A1 | * | 5/2006 | Dickenson | 707/6 |

OTHER PUBLICATIONS

Understanding of the Linux Kernel by Daniel P. Bovet and Marco Cesati Publication year Oct. 2000; ISBN 0-596-00002-2; Publisher: O'Reily; Chapters 6 and 7.*

* cited by examiner

*Primary Examiner*—Insun Kang
(74) *Attorney, Agent, or Firm*—Diana Roberts Gerhardt; Schubert Osterrieder & Nickelson PLLC (57) ABSTRACT

Methods, systems, and media to increase efficiency of tasks by observing the performance of generally equivalent code paths during execution of the task are disclosed. Embodiments involve a computer system with software, or hard-coded logic, that includes reflexive code paths. The reflexive code paths may be identified by a software or hardware designer during the design of the computer system. For that particular computer system, however, one of the code paths may offer better performance characteristics so a monitor collects performance data during execution of the reflexive code paths and a code path selector selects the reflexive code with favorable performance characteristics. One embodiment improves the performance of memory allocation by selectively implementing a tunable, linear, memory allocation module in place of a default memory allocation module.

25 Claims, 7 Drawing Sheets

NON-LINEAR MEMORY ALLOCATION

LINEAR MEMORY ALLOCATION

SELF-OPTIMIZABLE CODE WITH CODE PATH SELECTION AND EFFICIENT MEMORY ALLOCATION

FIELD OF INVENTION

The present invention is in the field of software and hardware design. More particularly, the present invention relates to methods, systems, and media to increase efficiency of tasks by observing the performance of generally equivalent code paths during execution of the task. One embodiment improves the performance of memory allocation by selectively implementing a tunable, linear, memory allocation scheme in place of a default memory allocation scheme.

BACKGROUND

Computer systems are well known in the art. They have attained widespread use for providing computer power to many segments of today's modern society. Computers are available in many different forms such as a desktop, floor standing, or portable computers and include, e.g., one or more central processing units (CPUs) and associated volatile and non-volatile memory. Some computer systems also include a display, an input-output device such as a keyboard and/or a mouse, one or more storage devices such as hard disk drives, and, in many instances, a network interface adapter. One of the distinguishing characteristics of these systems is the use of a motherboard or system planar to electrically connect these components together. Examples of such computer systems are IBM's e-Server series, ThinkPad series, and Intellistation series.

The widespread use of personal computers in conjunction with networks has resulted in a reliance on the network resources such as e-business enterprises for, e.g., telecommuting, obtaining news and stock market information, trading, banking, shopping, shipping, communicating in the form of Voice Internet protocol (VoiceIP) and email, as well as other services. For many, PCs represent an essential tool for their livelihood. Thus, in today's networked world, the availability and performance of the network is as important as the availability and performance of the personal computer.

Today's e-business environment is very competitive so there is no room for failure. Servers such as the IBM pSeries help e-business enterprises remain competitive by remaining operational 24/7, 365 days a year. Because reliability is mission-critical, such servers include features to monitor for problems, correct or bypass minor problems on the fly, and hot swappable components to allow failed components to be replaced without powering down the server.

Performance is also mission-critical. Performance relates not only to the response time of the server when loading and executing software for interactions with client systems but also the efficiency of systems designed to power up the server. The faster a program executes a function, the faster the server can respond to requests from client systems.

One problem faced by hardware and software designers for servers is that the servers are designed to increase performance generally for a large number of applications. Specific applications that clients may execute on servers involve different configurations of hardware and software. As a result, clients typically realize different levels of performance based upon their server configuration and the applications loaded on the server.

Software designers, in particular, are faced with designs that anticipate a multitude of applications, especially when the computer system for which the software is designed has the exceptional processing power of servers like IBMs e-Servers. When designing logic to be generally applicable for any clients' server configuration, a software designer may consider many possible code paths for a particular function to be interchangeable, or reflexive, for the purpose of attaining the desired result. For instance, a software designer may design a linked list data structure and, based upon the countless possible applications that could use and/or interact with the data structure, the software designer may believe that a code path that stores new links at the end of the linked list is equivalent to a code path that stores new links at the beginning of the linked list. Thus, the code path selected by the designer may not have the most favorable performance characteristics for a particular client's server configuration.

To illustrate, when a problem forces the server to be powered down and rebooted, performance of startup systems become significant. Currently, servers may take hours or even days to return to service once they are powered down. Thus, designers labor to increase the speed of systems related to powering up such servers. These designers, again, must find solutions that are generally applicable to many server configurations. As a result, the designers do not look for solutions that are specifically applicable to a single server configuration.

One prominent startup system for servers is the service processor. Service processors often include a processor, memory, basic system startup code, and other supporting hardware for loading initial program loads (IPLs). IPLs provide an interface between higher-level applications and hardware of the servers. For instance, a service processor may access a hard disk drive to load a hypervisor, which is a partition manager for a logically partitioned system.

Service processors perform tasks configured for particular customer solution and may execute, for example, about 30 tasks concurrently. Each task requires some amount of memory so the service processors provide a generally applicable memory allocation function for the tasks. Memory allocation can utilize a significant portion of the time required by a service processor to boot a server. One of IBM's e-Servers operating on a KIS operating system can take, for instance, 25 minutes to load IPLs to boot the server and a significant portion of the 25 minutes is dedicated to allocating memory for the IPLs. The generally applicable memory allocation function typically implemented by service processors exudes a non-linear allocation time characteristic. In other words, the time required to allocate memory increases in a non-linear manner as the amount of memory allocated increases, which depending upon the number of allocations for a particular server, can significantly decrease performance of the boot systems for the server. However, some particular customer solutions may benefit from a different memory allocation scheme that is essentially interchangeable with the typical memory allocation scheme.

Therefore, there is a need for methods and arrangements capable of increasing efficiency of code via intelligent selection between generally equivalent code paths such as equivalent data structures and memory allocation schemes. Further, there is a particular need to increase the speed of memory allocations to IPLs during the startup of servers by selectively implementing a tunable, linear, memory allocation module in place of a default memory allocation module.

SUMMARY OF THE INVENTION

The problems identified above are in large part addressed by methods, systems, and media to increase efficiency of tasks by observing the performance of generally equivalent code paths during execution of the task. One embodiment provides a method to select between more than one code paths for execution of a task by a computer system. The method generally includes determining performance characteristics from execution of the task by each of the more than one code paths. Each performance characteristic is attributable to a different code path of the more than one code paths. The method also includes comparing the characteristics to identify one code path of the more than one code paths based upon the characteristics and selecting the one code path of the more than one code paths for a subsequent execution of the task. The one code path then executes during the subsequent execution of the task by the computer system.

Another embodiment provides an apparatus to select between more than one code paths. The apparatus may include more than one code paths. Each code path is designed to perform a substantially equivalent function for a task. The apparatus also includes a performance monitor coupled with the more than one code paths to obtain performance characteristics from execution of the task by each of the more than one code paths. Each performance characteristic is attributable to a different code path of the more than one code paths. A code path selector coupled with the performance monitor may then compare the characteristics to identify one code path of the more than one code paths based upon the characteristics and select the one code path of the more than one code paths for a subsequent execution of the task. The one code path then executes during the subsequent execution of the task by the computer system.

Yet another embodiment provides a machine-accessible medium containing instructions, which when executed by a machine, cause said machine to perform operations. The operations may involve determining performance characteristics from execution of the task by each of the more than one code paths. Each performance characteristic is attributable to a different code path of the more than one code paths. The method also includes comparing the characteristics to identify one code path of the more than one code paths based upon the characteristics and selecting the one code path of the more than one code paths for a subsequent execution of the task. The one code path then executes during the subsequent execution of the task by the computer system.

A further embodiment provides a method to allocate memory. The method generally includes dividing a block of memory into sections. The sections are also sub-divided into more than one size of granules. The method then compares a size of an allocation request from a task against the more than one size of granules to select a section of the sections and allocates a granule from the section in response to the allocation request.

Another embodiment provides an apparatus to allocate memory. The apparatus may include a block of memory logically divided into sections. The sections are also sub-divided into more than one size of granules. The apparatus also includes a memory allocation module coupled with the block of memory to compare a size of an allocation request from a task against the more than one size of granules to select a section of the sections. The memory allocation module may then allocate a granule from the section in response to the allocation request.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to increase efficiency of code via intelligent selection between generally equivalent code paths and, in one embodiment, significantly improving efficiency of memory allocation by selectively implementing a tunable, linear, memory allocation module in place of a default memory allocation module are contemplated. Embodiments involve a computer system with software, or hard-coded logic, that includes reflexive code paths. The reflexive code paths may be identified by a software or hardware designer during the design of the computer system. Reflexive code paths may be code paths that are substantially equivalent from the designer's perspective. However, for particular client solutions, one of the code paths may have better performance characteristics. For instance, one of the reflexive code paths may generate an output faster in some embodiments, or not at all in other embodiments due to a conflict or other error.

In one embodiment, the reflexive code paths may include memory allocation modules designed to allocate memory for tasks executed by the service processor such as for loading initial program loads (IPLs). For instance, in many embodiments, a non-linear memory allocation module may provide reliable performance, allocating memory to IPLs at different rates depending upon the sequence of IPLs. However, a tunable, linear memory allocation module may provide a higher degree of granularity and allocate memory at more uniform rates for a sequence of IPLs. When a designer identifies such memory allocation modules as reflexive, the computer system may institute one memory allocation module when initially booted to measure the performance for that code path. Further, such embodiments may, e.g., modify the selection of the allocation module in the firmware so that a different reflexive code path is selected the next time the computer system is booted.

Once performance characteristics are obtained, a code path selector implemented on the computer system may compare performance characteristics of various reflexive code paths and select the most desirable code path. In many embodiments, the code path selector selects the favorable code path(s) before the client ever receives the computer system. In some embodiments, the code path selector may continue to monitor performance characteristics and update selections for code paths based upon actual use by clients.

While portions of the following detailed discussion describe reflexive code paths as software, functionality of code paths implemented by the software may also be hard-coded in state machines or otherwise implemented in hardware. Thus, embodiments that select between reflexive code paths implemented in hardware are also contemplated.

Figure 1:
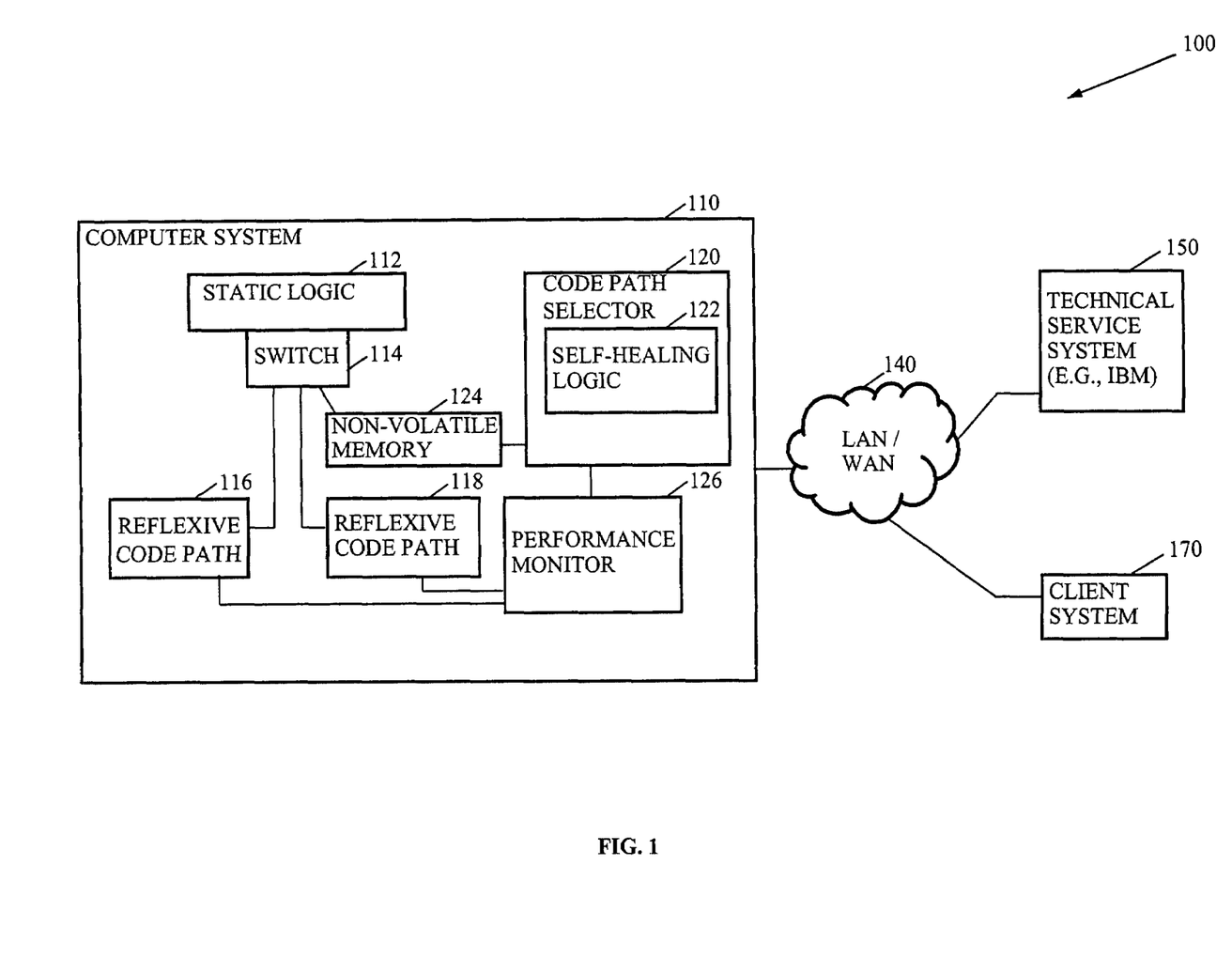
FIG. 1 depicts an embodiment of a system including a computer system that is designed to select between reflexive code paths identified by a software designer to improve performance.

Turning now to the drawings, FIG. 1 depicts an embodiment of a system 100 including a computer system 110 that is designed to select between reflexive code paths 116 and 118. Reflexive code paths 116 and 118 may be identified by a software designer to allow a code path selector 120 choose between the code paths to improve performance for a particular customer's solution. More specifically, system 100 may include computer system 110, a local area network/wide area network (LAN/WAN) 140, a technical service system 150, and a client system 170. Computer system 110 may be a server such as for an office, an Internet provider service (ISP), or the like. In some embodiments, computer system 110 may be a partition of a logically partitioned system.

Computer system 110 may be adapted to remain powered on and operational for many years, reporting any software and/or hardware errors to technical service system 150. For example, if an error such as a memory overflow occurs during memory allocations for firmware tasks, the firmware may be restarted and the overflow condition may be reported to technical service system 150. Technical service system 150 may be a service support system for a company such as IBM and reporting the error may initiate action by IBM to determine the source or cause of the memory overflow. In other situations, the memory overflow may cause the service processor to reset and restart or even cause computer system 110 to power down. In such situations, computer system 110 reports the error to technical service system 150.

Computer system 110 may include a static logic 112, a switch 114, reflexive code paths 116 and 118, a code path selector 120, a non-volatile memory 124, and a performance monitor 126. Static logic 112 may be hardware and/or software being executed to perform a task for computer system 110. For example, static logic 112 may store pointers or logical addresses in a linked list data structure for later retrieval.

Switch 114 may be hardware or a representation of a software function adapted to facilitate the execution of one of the reflexive code paths identified by the designer. In the present embodiment, switch 114 facilitates the execution of either reflexive code path 116 or reflexive code path 118 as sub-functions or supplemental functions of static logic 112. For example, reflexive code path 116 may store new pointers at the end of the linked list data structure, whereas reflexive code path 118 may store new pointers at the top of the linked list data structure.

Switch 114 may be adapted to have a minimal impact on the execution time of static logic 112. For instance, switch 114 may be set to select reflexive code path 116 or reflexive code path 118 upon start up of computer system 110 via non-volatile memory 124. In other embodiments, switch 114 may be adapted to change selections while computer system 110 is operational. In further embodiments, when reflexive code paths 116 and 118 are implemented by software, switch 114 may select between physical or logical addresses for reflexive code paths 116 and 118 to load instructions of the selected code path into cache for execution.

Figure 2:
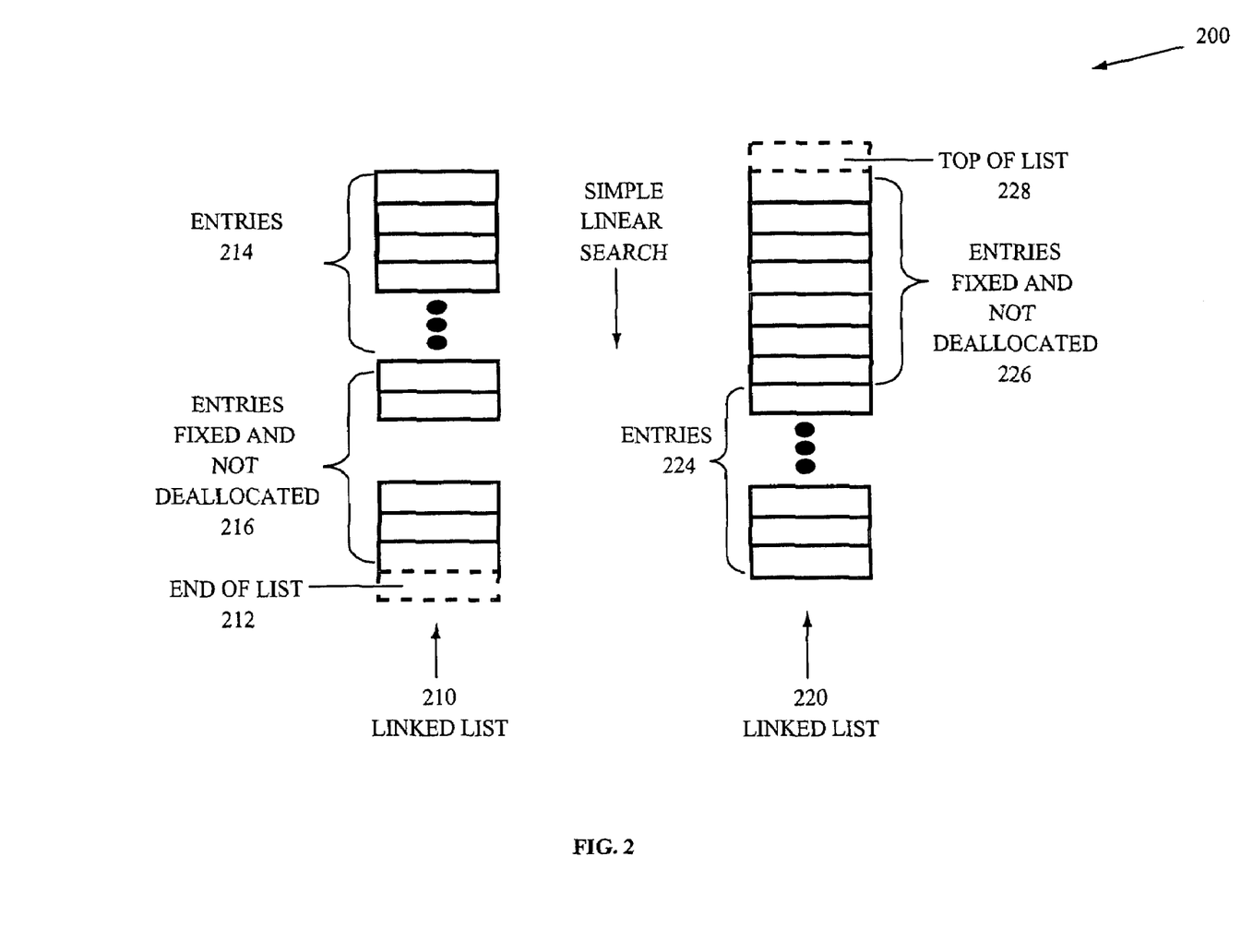
FIG. 2 depicts an embodiment of data structures generally considered reflexive, which negatively impacts performance for some client solutions.

FIG. 2 illustrates the data structures resulting from selection of reflexive code path 116 and reflexive code path 118. More specifically, linked list 210 represents the data structure implemented by static logic 112 when switch 114 selects reflexive code path 116 and linked list 220 represents the data structure implemented by static logic 112 when switch 114 selects reflexive code path 118.

Reflexive code paths 116 and 118 offer the same function and would provide similar performance if the content of the linked lists were random. However, for situations in which computer system 110 tends to perform the same tasks in the same or substantially the same order, the linked lists 210 and 220 may typically offer different performance characteristics. Thus, for a specific customers solution, linked list 210 may offer significantly improved performance over linked list 220, or vice versa. For example, when searching the data structure, static logic 112 may search with a simple linear search from the top of the linked list down to the end of the list. Linked list 210 places new entries at the end of the list 212 and initially receives entries 214. Entries 214 are allocated, searched, and deallocated often. Entries 216, however, remain allocated while computer system 110 is operational and are searched very seldom. Thus, when static logic 112 searches linked list 210 for one of the entries 214, the corresponding pointers are returned quickly.

Linked list 220 places new entries at the top of the list 228 and initially receives entries 224. Entries 224 are allocated, searched, and deallocated often, and entries 226 remain allocated while computer system 110 is operational. In addition, entries 226 may not be searched very often. For linked list 220 however, static logic 112 must step through each of entries 226 every time entries 224 are being searched. Thus, a constant delay is added to every search performed for entries 224, which consistently degrades the performance associated with linked list 220.

In alternative embodiments, the designer of static logic 112 may identify the direction of search as the reflexive code paths. In such embodiments, switch 114 may switch between code paths that search from the top of the data structure to the end of the data structure and from the end of the data structure to the top of the data structure.

In further embodiments, depending upon the nature of static logic 112 and the reflexive code paths 116 and 118, switch 114 may be adapted to select one reflexive code path for a first operation and a second reflexive code path for a subsequent operation while computer system 110 remains operational. For example, reflexive code path 116 may represent a search for values less than a threshold value, and reflexive code path 118 may represent a search for values greater than or equal to the threshold value. Switch 114 may change selections between reflexive code path 116 and reflexive code path 118 while computer system 110 is operational. In some of these embodiments, switch 114 may be adapted to change selections based upon the content of the data structure.

Code path selector 120 may be logic to determine the state of switch 114 and may be implemented via software and/or state machines. For instance, during a testing stage of the construction of computer system 110, code path selector 120 may modify the state of switch 114 to switch between reflexive code paths 116 and 118. Performance monitor 126 may gather performance data for making an intelligent selection between the identified reflexive code paths 116 and 118 while switching between reflexive code paths 116 and 118. Code path selector 120 may store a value in non-volatile memory 124 and the value may determine the state of switch 114, selecting either reflexive code path 116 or reflexive code path 118. In some embodiments, the value is copied from non-volatile memory 124 into a buffer for switch 114 to select one of the reflexive code paths 116 and 118. In further embodiments, switch 114 may read the value from non-volatile memory 124. In other embodiments, non-volatile memory 124 may contain the firmware and the firmware may set the state of switch 114 when computer system 110 is booted.

In some embodiments, code path selector 120 may include self-healing logic 122 to improve the reliability of computer system 110. For example, self-healing logic 122 may recognize failures or serious errors encountered from use of reflexive code path 116 via performance monitor 126. In response, self-healing logic 122 may set the state of switch 114 to select reflexive code path 118. Code path selector 120 may report the errors to technical service system 150 via LAN/WAN 140.

Performance monitor 126 may monitor one or more performance characteristics of reflexive code paths 116 and 118 to select the reflexive code path with more favorable performance characteristics. For example, performance monitor 126 may include a counter to measure differences in cycles expended to execute the reflexive code paths 116 and 118. In further embodiments, performance monitor 126 may capture a time index when static logic 112 begins to process an instruction and capture another time index when a result is output from one of the reflexive code paths 116 and 118. Several embodiments may monitor for errors or failures during respective executions of reflexive code paths 116 and 118.

LAN/WAN 140 is a network connection to couple computer system 110 with technical service system 150 and client system 170 to facilitate communications. In some embodiments, LAN/WAN 140 may include a network in an office coupled via Ethernet, optical media like OptiConnect, a wireless network, or the like. In several embodiments, LAN/WAN 140 also couples with the Internet via a cable modem, a digital subscriber line (DSL), a T1 line, a T3 line, or the like. In further embodiments, LAN/WAN 140 may include a network of temporary connections such as connections via a telephone system.

Client system 170 may be a computer system at a different office location or at a client's facility. Client system 170 may include any type of computer systems or data storage systems having a TCP/IP interface, or the like, for receiving and transmitting transactions via LAN/WAN 140.

Figure 3:
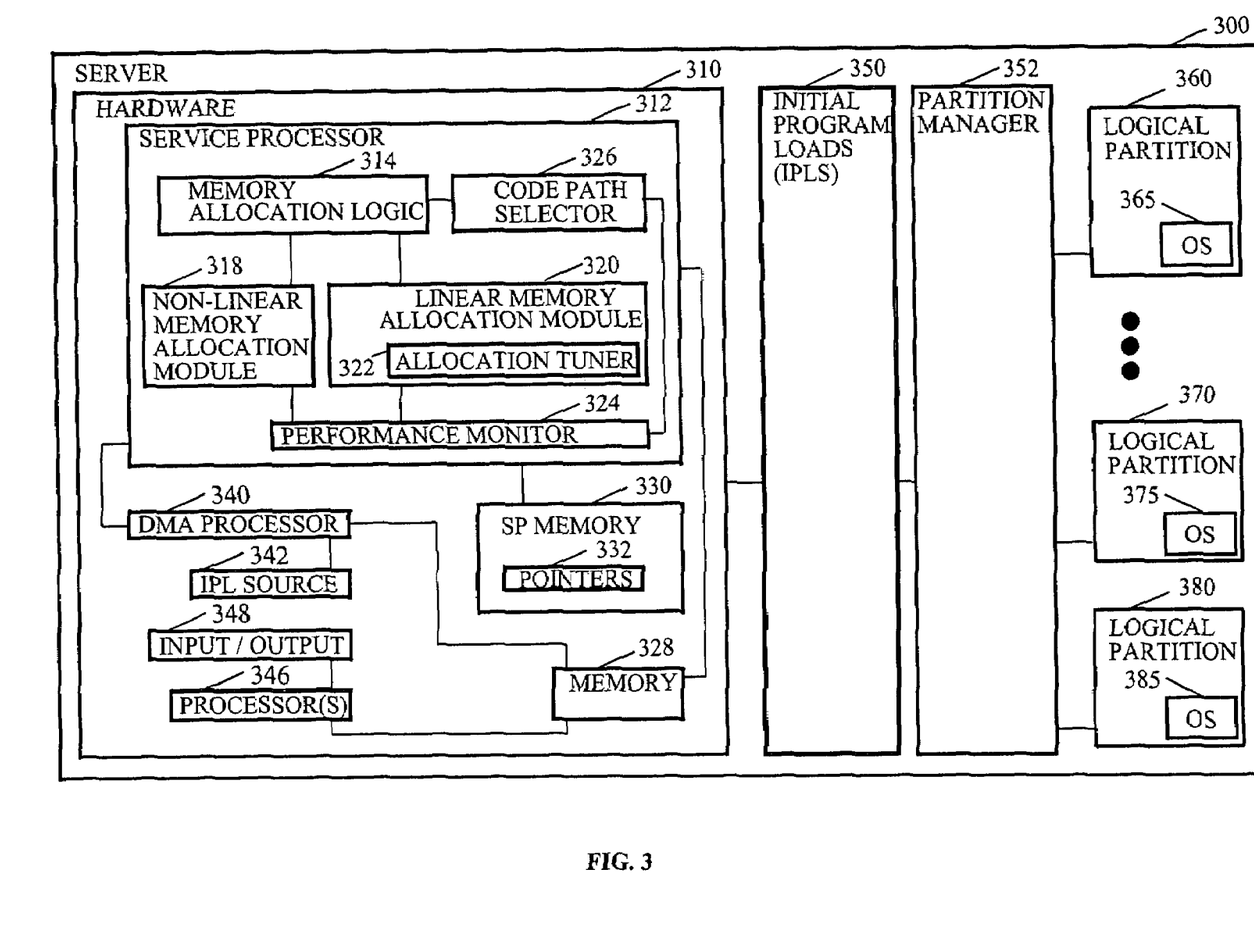
FIG. 3 depicts an embodiment of a logically partitioned server designed to select between a non-linear memory allocation module and a linear memory allocation module tuned for performance.

FIG. 3 depicts an embodiment of a logically partitioned server 300 designed to select between a non-linear memory allocation module 318 and a linear memory allocation module 320 tuned for performance. Server 300 includes hardware 310 and layers of software including initial program loads (IPLs) 350, partition manager 352, and logical partitions 360, 370, and 380 to provide an interface between clients of the partitions and hardware 310.

In logically partitioned server 300, available system resources such as processor(s) 346 and memory 328 of hardware 310 as well as external devices coupled with hardware 310 via input/output (I/O) 348 are allocated among multiple, logical partitions 360, 370, and 380. Each logical partition 360, 370, and 380 is adapted to appear to operate independently of the other as separate computer systems. Management of the system resources among logical partitions 360, 370, and 380 is accomplished via a layer of software components commonly referred to as partition manager 352.

An objective of partition manager 352 is to allow each logical partition 360, 370, and 380 to independently run software such as operating systems (OSs) 365, 375, and 385 and operating system specific applications. OSs 365, 375, and 385 are each developed to run on a dedicated computer system, with little or no modification. For example, logical partition 360 may be running an OS 365 such as IBMs OS/400, logical partition 370 may be running an OS 375 such as IBMs AIX, and logical partition 380 may be running an OS 385 such as LINUX. By providing the ability to run multiple operating systems on the same computer system, server 300 may provide a user with a greater deal of freedom choosing application software best suited to the user's need with little or no regard to the operating system for which the application program was written.

IPLs 350 provide an interface between hardware 310 and partition manager 352 to facilitate division of the system resources between logical partitions 360, 370, and 380. More specifically, IPLs 350 include instructions that are automatically executed on startup. These instructions may search for partition manager 352, load it and pass control to it. In some embodiments, IPLs 350 manage basic server 300 functions such as communicating with partition manager 352 to start up logical partitions at pre-specified times. In further embodiments, IPLs 350 may also initiate a primary logical partition that is capable of managing secondary logical partitions.

Hardware 310 includes a service processor 314, a service processor (SP) memory 330, memory 328, a direct memory access processor 340, an IPL source 342, processor(s) 346, and I/O 348. Service processor 312 may be adapted to selectively implement non-linear memory allocation module 318 and/or linear memory allocation module 320 dependent upon observed performance characteristics of the memory allocation modules 318 and 320 within server 300. For example, during testing stages of the construction of server 300, memory allocation logic 314 is communicatively coupled with code path selector 326 to alternatively perform memory allocations with non-linear memory allocation module 318 and linear memory allocation module 320 to gather performance data. The performance data may include, e.g., performance times, cycle counts, indications regarding a task's ability to execute utilizing memory allocations from each allocation module 318 and 320, and/or other performance characteristics.

Memory allocation logic 314 may receive requests for memory allocations from tasks running on service processor 312 and implements either non-linear memory allocation module 318 or linear memory allocation module 320 in accordance with an indication from code path selector 326. Non-linear memory allocation module 318 may assign memory in granules of 16 kilobytes from memory by searching for the first available block of memory large enough for the allocation request from the task. More specifically, memory allocation logic 314 may receive a request for a memory allocation from a task executing on service processor 312. The task may request 4 kilobytes of memory. In response, non-linear memory allocation module 318 may search pointers 332 in SP memory 330 to determine the first available granule of 16 kilobytes from the top of the memory 328.

Figure 4:
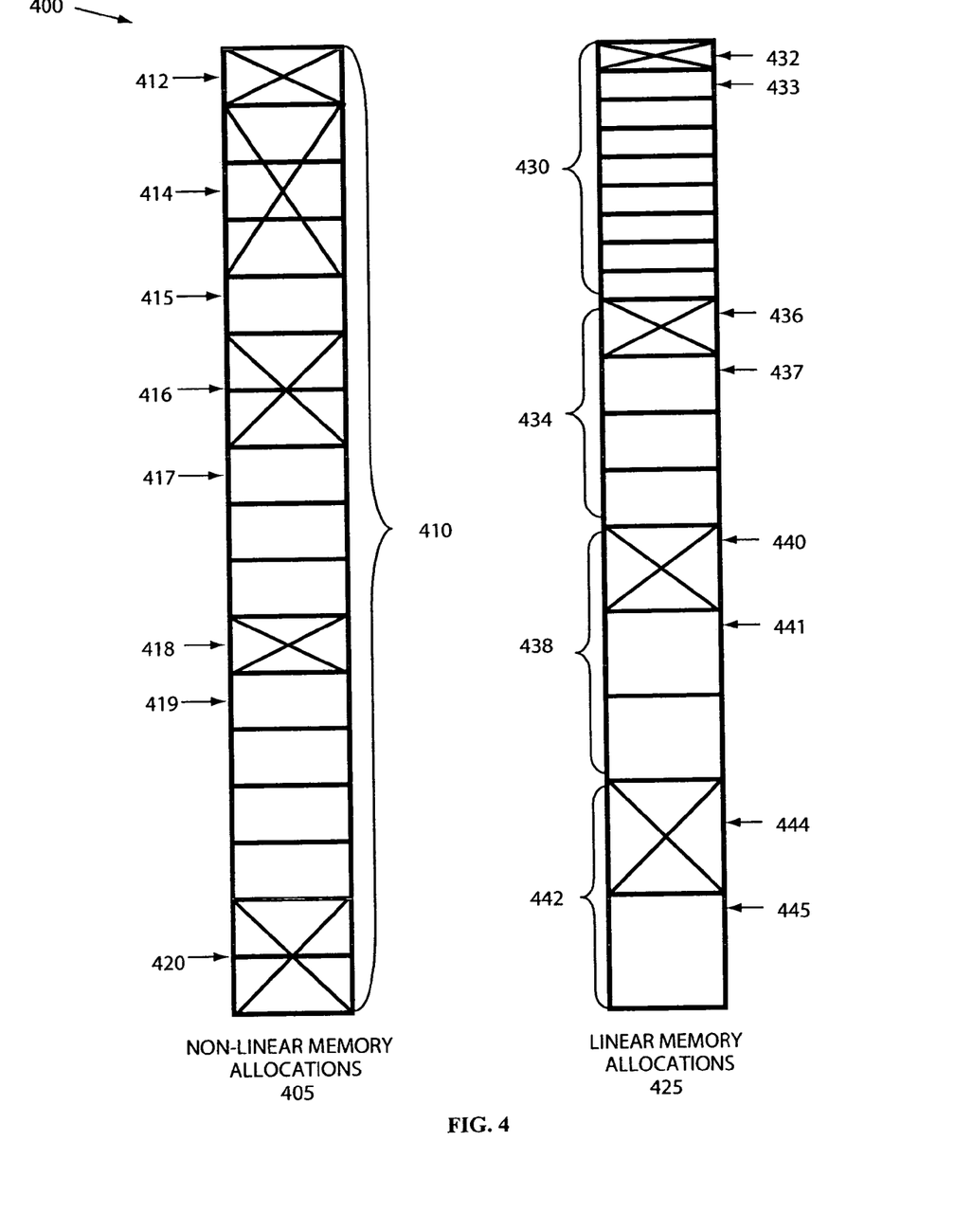
FIG. 4 depicts examples of the non-linear memory allocation module and the tunable, linear memory allocation module of FIG. 3.

FIG. 4 depicts memory 400 having non-linear memory allocations 405 and linear memory allocations 425. Non-linear memory allocations 405 illustrate a state of memory 328, or a portion thereof, when non-linear memory allocation module 318 searches for the first available granule of 16 kilobytes. This state of memory 328 results from repeated allocations and deallocations in different areas of memory 328. Memory blocks such as block 415 illustrate a 16-kilobyte granule of memory 328 and granules having an "X" illustrate granules that are allocated to a task. Thus, when non-linear memory allocation module 318 searches for the first available granule, non-linear memory allocation module 318 looks to granule 412 and determines that the granule is unavailable. Similarly, non-linear memory allocation module 318 determines that granules 414 are unavailable. Finally, non-linear memory allocation module 318 determines that granule 415 is available and is large enough to cover the 4-kilobyte request from the task.

Further, when non-linear memory allocation module 318 is searching for more than one granule such as for a memory allocation of 32 kilobytes, non-linear memory allocation module 318 searches memory 328 for the first available pair of consecutive granules of memory 328. In some embodiments, when an insufficient number of consecutive granules of memory 328 are available, non-consecutive granules may be allocated.

Linear memory allocation module 320 may be implemented in place of or in addition to non-linear memory allocation module 318. During initial runs, such as during the testing stages of construction of server 300, performance monitor 324 may monitor performance characteristics of memory allocations by linear memory allocation module 320. The performance characteristics may include, for instance, an indication of the size of the allocations requested by tasks and/or whether linear memory allocation module 320 is adapted to efficiently handle the allocation requests. In further embodiments, performance monitor 324 may continue to monitor the performance of the memory allocation modules.

Linear memory allocations 425 of FIG. 4, for example, illustrates a state of memory 328, or a portion thereof, when adapted for usage by linear memory allocation module 320. When executing linear memory allocation module 320 for the first time, linear memory allocation module 320 divides memory 328 into sections such as sections 430, 434, 438, and 442, either logically or physically. The sections 430, 434, 438, and 442 are further sub-divided into granules, which are a different size in each section. For example, section 430 of linear memory allocations 425 may include granules of 4 kilobytes, section 434 may include granules of 16 kilobytes, section 438 may include granules of 32 kilobytes and section 442 may include granules of 64 kilobytes. In other embodiments, different sizes of granules may be available.

Upon receiving a request for a memory allocation, linear memory allocation module 320 jumps to the section that includes granules of a size, which alone, or combined, provide an allocation that is closest to the size of the allocation request. Different embodiments may select sections in different manners but many embodiments allocate one granule or more than one consecutive granules from a single section to satisfy an allocation request.

Allocation tuner 322 couples with performance monitor 324 to improve or tune the efficiency of memory allocations by adjusting the number of sections, the memory allocated to each section, and the size of the granules within each section. In such embodiments, performance monitor 324 may track the maximum number of granules from each section 430, 434, 438, and 442 that remain allocated concurrently, and/or a count of the different sizes of allocations requested by tasks during steady state operations. Allocation tuner 322 may then process the data received from performance monitor 324 to determine how one or more sections may be adjusted, added, and/or deleted, to tailor operations for typical operations of server 300.

Performance monitor 324 may also monitor for errors or failures of one or both of the allocation modules 318 and 320 to communicate the errors and failures to code path selector 326. In response to an error or failure, code path selector 326 may adjust or adapt selection of the memory allocations modules to avoid the problem for subsequent allocations and server 300 may report the error or failure to a technical service provider such as IBM. For example, a particular task may request a 4-kilobyte memory allocation. When non-linear memory allocation module 318 is processing the allocation request, the first available 16-kilobyte granule, granule 415, is allocated to the task. However, when linear memory allocation module 320 is processing the allocation request, the first available 4-kilobyte granule in section 430 is allocated to the task. Thus, when the task actually uses more memory than 4 kilobytes due to some error in the coding of the task, linear memory allocation module 320 encounters a memory overflow error while is processing the allocation request.

Non-linear memory allocation module 318 does not encounter the memory overflow error when processing the allocation request under the same circumstances if the memory overflow does not exceed the 16 kilobytes allocated to the task. As a result, code path selector 326 may select the non-linear memory allocation module 318 at least for that particular task and possibly for all memory allocations.

Code path selector 326 may compare performance data from performance monitor 324 for each of the allocation modules 318 and 320 to determine which memory allocation module offers more desirable performance characteristics for server 300. In particular, some embodiments may be adapted to select the memory allocation that has no errors or failures. Such embodiments may also select the memory allocation module based upon how quickly memory allocations are made if no failures or errors are encountered. Further embodiments, may be adapted to selectively switch between memory allocation modules, e.g., on a task per task basis.

DMA processor 340 may couple with service processor 312 and IPL source 342 to load the IPLs directly from the IPL source into memory 328 for execution by processor(s) 346. Processor(s) 346 may couple with I/O 348 and memory 328 to utilize resources external to server 300 and to support functionality of logical partitions 360, 370, and 380.

Figure 5:
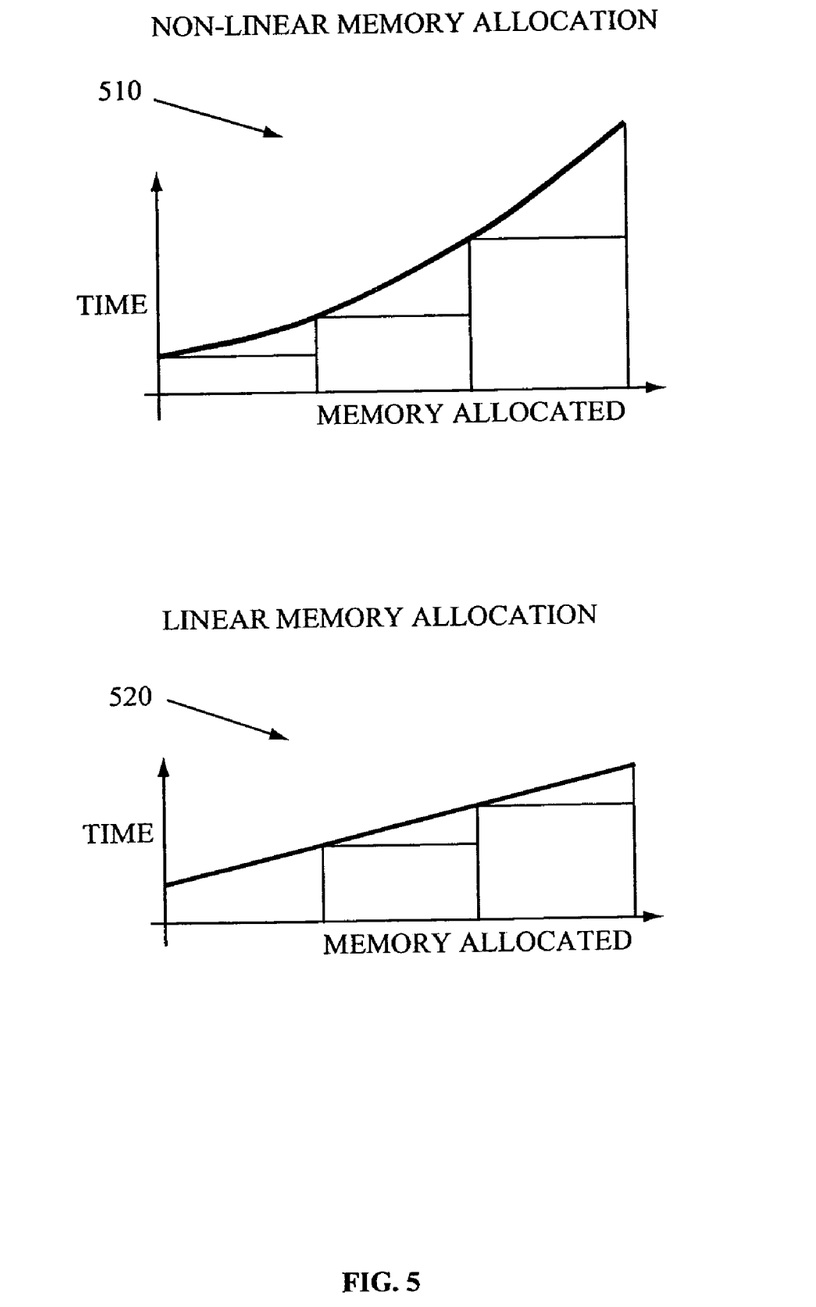
FIG. 5 depicts graphs describing conceptually, the difference in performance found between the non-linear memory allocation module and the tunable, linear memory allocation module of FIG. 3.

Turning to FIG. 5, there are shown graphs 510 and 520 that generally describe a difference in performance found between the non-linear memory allocation module 318 and the tunable, linear memory allocation module 320 discussed in conjunction with FIG. 3. More specifically, the graphs 510 and 520 depict a relationship between the amounts of time required to allocate memory to a task in response to an allocation request. Graph 510 describes the performance for the non-linear memory allocation module 318 and graph 520 describes the performance of the linear memory allocation module 320.

With each increase in the total memory allocated, the length of time consumed by non-linear memory allocation module 318 to allocate memory increases in a non-linear manner. Turning to FIG. 4, the non-linear increase in the time to allocate memory results from the scattering of memory granules available for allocation. For example, if a task requests more than 16 kilobytes of memory, the non-linear memory allocation module 318 searches the non-linear memory allocations 405 to find the first available pair of consecutive granules 417. In the present embodiment, approximately half of the memory allocated to the non-linear memory allocation module 318 is searched before the first pair of consecutive granules 417 is located. Further, if the allocation request is for more than 32 kilobytes, the non-linear memory allocation module 318 searches two-thirds of the memory before locating the first, three available, consecutive granules 419.

By contrast, graph 520 illustrates the substantially linear increase in memory allocation speed associated with the linear memory allocation module 320 as the number of concurrent memory allocations rise. Turning to FIG. 4, the linear increase in the time to allocate memory results from the organization of memory granules into sections 430, 434, 438, and 442. For example, if a task requests 4 kilobytes, linear memory allocation module 320 begins a search for the first available granule 433 in section 430 at, e.g., granule 432. Similarly, when a task requests an allocation of more than 16 kilobytes of memory, the linear memory allocation module 320 searches the linear memory allocations 425 for the first available granule 441 starting at the first granule 440 in section 438. Further, when granule 432 is deallocated, granule 432 is the first granule searched when linear memory allocation module 320 searches for another 4-kilobyte granule. Note that the speed of the allocations can be improved by allocation tuner 322 by taking into account the numbers of each granule that are typically used by the tasks and also by selectively switching between the code paths for searching for the granules from a top of the section or the bottom of the section based upon the extent of concurrent memory allocations from the section.

Figure 6:
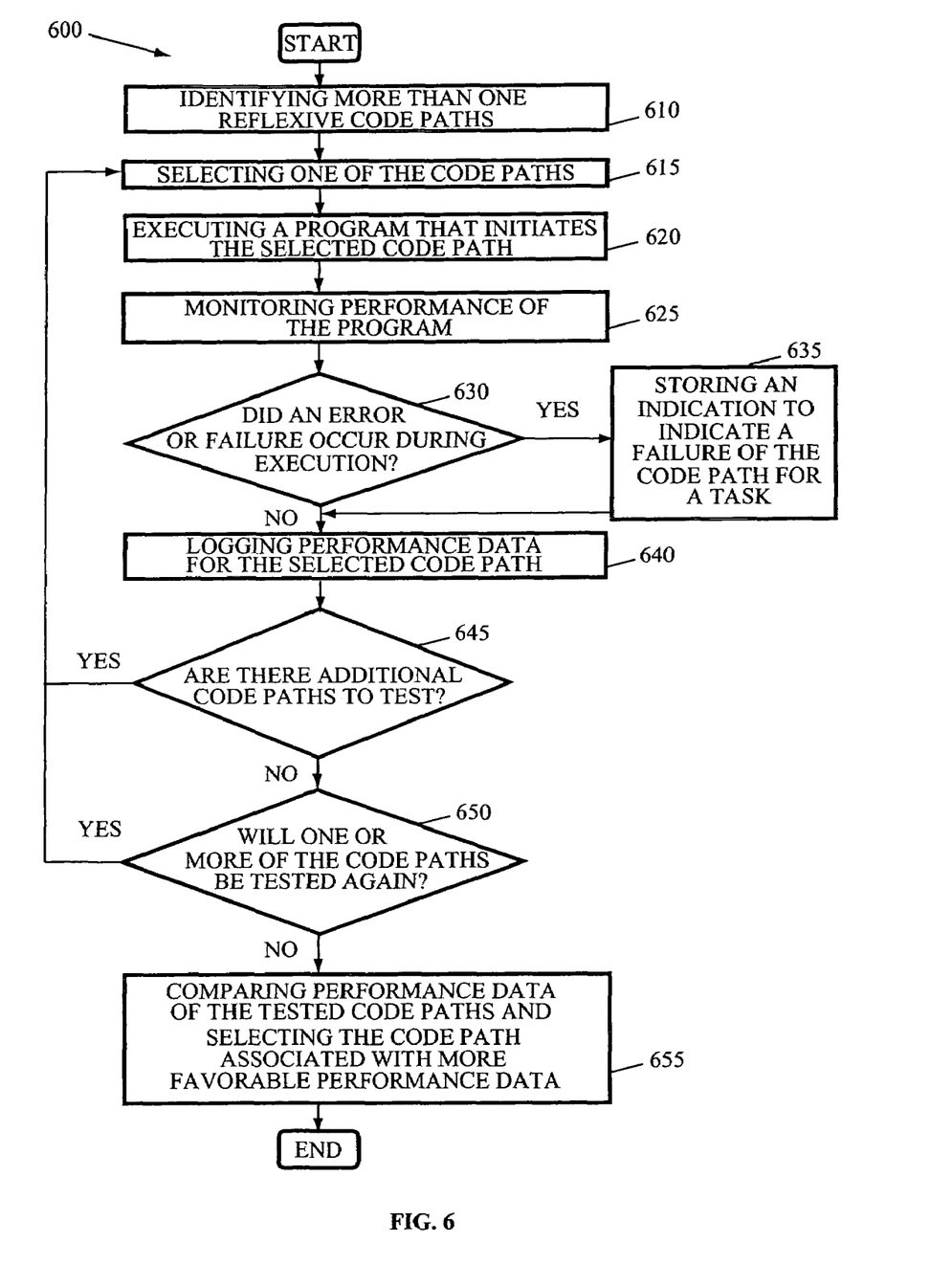
FIG. 6 depicts an example of a flow chart for selecting between reflexive code paths.

Referring now to FIG. 6, there is shown an example of a flow chart 600 for selecting between reflexive code paths available to a program. Flow chart 600 begins with identifying more than one reflexive code paths (element 610). In particular, a designer for the system may store an indication accessible to a code path selector that indicates that more than one substantially equivalent code paths may be selected to perform a function such as a comparison or a search.

Upon identifying the more than one reflexive code paths, a code path selector, such as code path selector 120 of FIG. 1, may alternately select the reflexive code paths (element 615). Selection of a reflexive code path causes the program to execute the reflexive code path (element 620) during the execution of the program. In some embodiments, selection of the code path occurs and can only be changed when the computer system is booted. In further embodiments, a code path selector may be adapted to select between reflexive code paths while the computer system remains operational. Advantageously, such embodiments may gather sufficient data regarding the operation of each of the reflexive code paths to intelligently select the code path with more favorable performance characteristics without rebooting the computer system.

A performance monitor captures performance data associated with execution of the reflexive code paths when executed in conjunction with the program (element 625). The performance data may be unique for the particular computer system and/or may be unique for a group of computer systems. In the latter case, selection of code paths can advantageously improve performance for a group of computer systems that have similar software and/or hardware configurations.

If an error or failure occurs while executing one of the reflexive code paths in conjunction with the program (element 630), an indication of the error or failure is stored and associated with the reflexive code path and/or the particular task that was executing during the error or failure (element 635).

The performance data is then logged so that performance data for each of the more than one reflexive code paths (element 640) can be evaluated. If there are more reflexive code paths to test (element 645) or if one or more of the reflexive code paths will be tested again (element 650), another reflexive code path is selected for the next test (element 615).

Otherwise, the performance data for each of the respective reflexive code paths are compared to determine which reflexive code path, or combination of code paths, should be implemented on the computer system for performance (element 655). For example, in several embodiments, selection between reflexive code paths may be determined and further performance monitoring disabled before the computer system is delivered to a customer. In further embodiments, one or more code path selectors may remain active, continuously or periodically updating the selection of reflexive code paths during the operation of the computer system by the customer.

Figure 7:
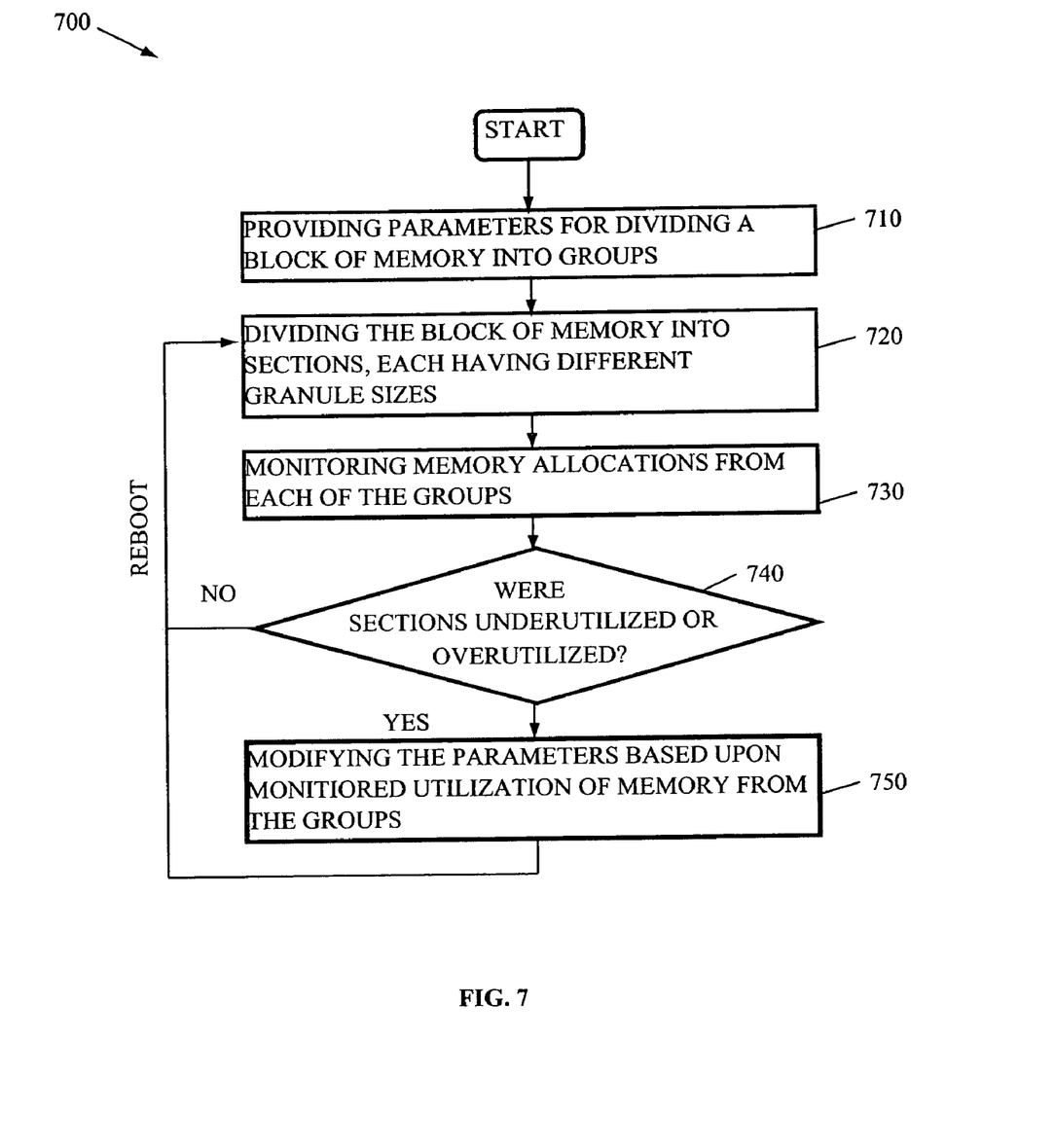
FIG. 7 depicts an example of a flow chart to tune the linear memory allocation module discussed in FIG. 3.

Referring now to FIG. 7, there is shown an example of a flow chart 700 to tune the linear memory allocation module discussed in FIG. 3. Flow chart 700 begins with providing parameters for dividing a block of memory into sections, each having different granule sizes (element 710). In particular, the embodiment generates pointers to associate logical or physical memory addresses with a default or tuned division of memory into various sizes of granules.

After the divisions are determined, the embodiment divides addresses into sections and sub-divides each section into different granule sizes (element 720). Upon receipt of an allocation request from a task, a performance monitor begins to track the usage of the different granules for memory allocations out of each of the groups (element 730). An allocation tuner may then determine whether to change the current divisions of memory into the sections based upon the actual memory allocations. More specifically, if one or more sections of granules were overutilized or underutilized (element 740), the number of granules available in the sections may be modified to more closely match the actual demand (element 750) and the changes may be implemented after the computer system is rebooted. In some embodiments, the allocation tuner may also modify the number of sections and/or the granularity of memory allocations from each of the sections. Otherwise, when no modifications are made, the same division of memory may be implemented the next time the computer system boots.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates observation of the performance of generally equivalent code paths during execution of a task and selection of the code path having a more favorable performance characteristic. Embodiments also contemplate selective implementation of a tunable, linear, memory allocation scheme in place of a default memory allocation scheme. It is understood that the form of the invention shown and described in the detailed description and the drawings are to be taken merely as examples. It is intended that the following claims be interpreted broadly to embrace all the variations of the example embodiments disclosed.

What is claimed is:

1. A method to select one of a plurality of reflexive code paths for execution of a task by a computer system, the method comprising:
   determining performance characteristics from execution of the task by each of the plurality of reflexive code paths, each performance characteristic being attributable to a different code path of the code paths;
   wherein in response to a memory allocation request for memory for the task, a first code path of the code paths invokes a linear allocation of the requested memory and a second code path of the code paths invokes a non-linear allocation of the requested memory;
   wherein the non-linear allocation of the requested memory divides the memory into a number of contiguous granules of equal size, and the linear allocation of the requested memory divides the memory into at least a first section and a second section, the first and second sections being contiguous and non-overlapping, wherein the first section is evenly divided into a plurality of granules of a first equal size and the second section is evenly divided into a plurality of granules of a second equal size twice as large as the first equal size, wherein the usage of the granules out of each of the sections is tracked and a size of the memory allocation request from the task against the granules in the sections to select one section of the sections is compared, and assigns the smallest granule size available in the two sections that is closest to and satisfies the size of the memory request to allocate a smallest granule size from the section in response to the memory allocation request;
   comparing the performance characteristics to identify one code path of the first and second code paths that increases performance based upon the characteristics;
   selecting the identified code path to be executed in a subsequent execution of the task; changing the state of a switch to the selection of the identified code path;
   and executing the one identified code path during the subsequent execution of the task by the computer system.

2. The method of claim 1, further comprising determining from a linked list the size and availability of one or more granules from each section.

3. The method of claim 1, further comprising adjusting, based on the performance characteristics, a number of contiguous, non-overlapping sections.

4. The method of claim 1, further comprising adjusting, based on the performance characteristics, a size of a section and the number of granules in the sections.

5. The method of claim 1, further comprising adjusting, based on the performance characteristics, a size of granules in the sections.

6. The method of claim 1, further comprising monitoring a maximum number of granules in the sections that remain allocated concurrently.

7. The method of claim 1, wherein which memory allocation is invoked in the subsequent execution depends on how fast memory allocations can be made in each path.

8. An apparatus, comprising:
   a plurality of reflexive code paths, each being designed to perform a substantially equivalent function for a task;
   wherein in response to a memory allocation request for memory for the task, a first code path of the plural code paths invokes a linear allocation of the requested memory and a second code path of the plural code paths invokes a non-linear allocation of the requested memory;
   wherein the non-linear allocation of memory divides the memory into a number of contiguous granules of equal size, and a linear allocation of memory divides the memory into at least a first section and a second section, the first and second sections being contiguous and non-overlapping, wherein the first section is divided into a plurality of granules of a first equal size and the second section is divided into a plurality of granules of a second equal size twice as large as the first equal size, wherein the usage of the granules out of each of the sections is tracked and a size of the memory allocation request from the task against the granules in the sections to select one section of the sections is compared, and assigns the smallest granule size available in the two sections that is closest to and satisfies the size of the memory request to allocate the smallest granule size from the section in response to the memory allocation request;
   performance monitoring circuitry coupled with the more than one code paths to obtain performance characteristics from execution of the task by each of the more than one code paths, each performance characteristic being attributable to a different code path of the more than one code paths; and
   code path selector circuitry coupled with the performance monitoring circuitry to compare the characteristics to identify one code path of the code paths that increases performance based upon the characteristics and to select the identified code path to be executed in a subsequent execution of the task, changing the state of a switch to the selection of the identified code path; wherein the identified code path executes during the subsequent execution of the task.

9. The apparatus of claim 8, wherein the code path selector changes the state of the switch while rebooting.

10. The apparatus of claim 8, wherein invoking the linear allocation of the requested memory comprises determining from a linked list the size and availability of one or more granules from each section.

11. The apparatus of claim 8, further comprising an adjuster to adjust, based on the performance characteristics, a number of contiguous, non-overlapping sections.

12. The apparatus of claim 8, further comprising an adjuster to adjust, based on the performance characteristics, a size of the sections and the number of granules in the sections.

13. The apparatus of claim 8, further comprising an adjuster to adjust, based on the performance characteristics, a size of granules in the sections.

14. The apparatus of claim 8, wherein the performance monitoring circuitry further monitors a maximum number of granules in the sections that remain allocated concurrently.

15. The apparatus of claim 8, wherein which memory allocation is invoked in the subsequent execution depends on how fast memory allocations can be made in each path.

16. A storage medium containing instructions, which when executed by a machine, cause said machine to perform operations, comprising:

determining performance characteristics from execution of a task by each of a plurality of reflexive code paths, each performance characteristic being attributable to a different code path of the code paths; wherein in response to a memory allocation request for memory for the task, a first code path of the code paths invokes a linear allocation of the requested memory and a second code path of the code paths invokes a non-linear allocation of the requested memory; wherein the non-linear allocation of the memory divides the memory into a number of contiguous granules of equal size, and the linear allocation of the requested memory divides the memory into at least a first section and a second section, the first and second sections being contiguous and non-overlapping, wherein the first section is divided into a plurality of granules of a first equal size and the second section is divided into a plurality of granules of a second equal size twice as large as the first equal size, wherein the usage of the granules out of each of the sections is tracked and a size of the memory allocation request from the task against the granules in the sections to select one section of the sections is compared, and assigns the smallest granule size available in the two sections that is closest to and satisfies the size of the memory allocation request to allocate the smallest granule size from the sections in response to the memory allocation request; comparing the characteristics to identify one code path of the code paths that increases performance based upon the characteristics;

selecting the identified code path to be executed in a subsequent execution of the task;

changing the state of a switch to the selection of the identified code path; and executing the identified code path during the subsequent execution of the task.

17. The storage medium of claim 16, further comprising determining from a linked list the size and availability of one or more granules from each section.

18. The storage medium of claim 16, further comprising adjusting, based on the performance characteristics, a number of contiguous, non-overlapping sections.

19. The storage medium of claim 16, further comprising adjusting, based the performance characteristics, a size of a section and the number of granules in the sections.

20. The storage medium of claim 16, further comprising adjusting, based on the performance characteristics, a size of granules in the sections.

21. The storage medium of claim 16, further comprising monitoring a maximum number of granules in the sections that remain allocated concurrently.

22. The storage medium of claim 16, wherein which memory allocation is invoked in the subsequent execution depends on how fast memory allocations can be made in each path.

23. A method to select one of a plurality of reflexive code paths for execution of a task by a computer system and allocate memory, the method comprising:

determining performance characteristics from execution of the task by each of the plurality of reflexive code paths, each performance characteristic being attributable to a different code path of the code paths;

wherein in response to a memory allocation request for memory for the task, a first code path of the code paths invokes a linear allocation of the requested memory and a second code path of the code paths invokes a non-linear allocation of the requested memory;

wherein the non-linear allocation of the requested memory divides the memory into a number of contiguous granules of equal size, and the linear allocation of the requested memory divides the memory into at least a first section and a second section, the first and second sections being contiguous and non-overlapping, wherein the first section is evenly divided into a plurality of granules of a first equal size $2^N$ kilobytes and the second section is evenly divided into a plurality of granules of a second equal size twice as large as the first equal size where N>0, wherein the usage of the granules out of each of the sections is tracked and a size of the memory allocation request from the task against the granules in the sections to select one section of the sections is compared, and assigns the smallest granule size available in the two sections that is closest to and satisfies the size of the memory request to allocate the smallest granule size from the sections in response to the memory allocation request;

comparing the performance characteristics to identify one code path of the first and second code paths that increases performance based upon the characteristics;

selecting the identified code path to be executed in a subsequent execution of the task;

changing the state of a switch to the selection of the identified code path;

and executing the one identified code path during the subsequent execution of the task by the computer system.

24. The method of claim 23, further comprising adjusting the number of contiguous non-overlapping sections, based upon memory allocations made from the sections during execution of the task, to improve performance during subsequent execution of the task.

25. The method of claim 23, further comprising adjusting the size of the equal-sized granules in the sections based upon memory allocations made during execution of the task, to improve performance during subsequent execution of the task.

* * * * *